(No Model.)
W. H. TRAMMEL.
FENDER FOR PLOWS.
No. 415,887. Patented Nov. 26, 1889.
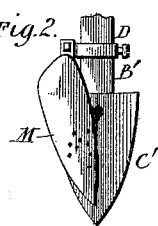
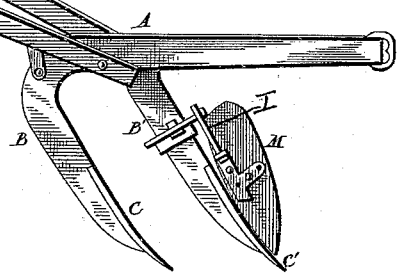
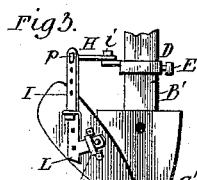
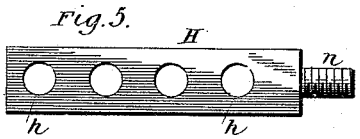
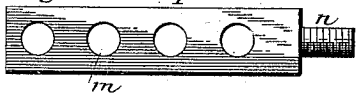
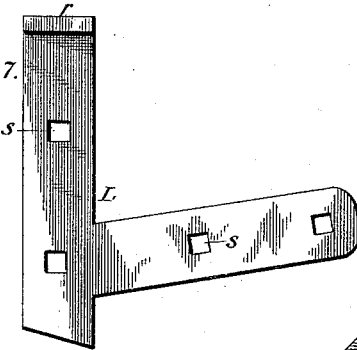
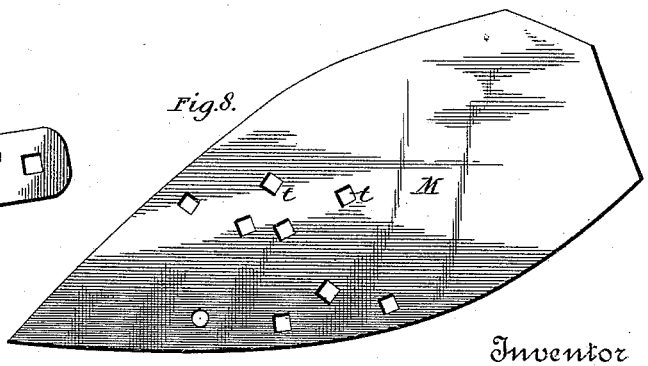
Witnesses
Inventor
William H. Trammel
By his Attorney

UNITED STATES PATENT OFFICE.

WILLIAM H. TRAMMEL, OF HUNTINGTON, INDIANA.

FENDER FOR PLOWS.

SPECIFICATION forming part of Letters Patent No. 415,887, dated November 26, 1889.

Application filed July 27, 1889. Serial No. 318,873. (No model.)

*To all whom it may concern:*

Be it known that I, WILLIAM H. TRAMMEL, a citizen of the United States, residing at Huntington, in the county of Huntington and State of Indiana, have invented certain new and useful Improvements in Fenders for Plows; and I do hereby declare the following to be a full, clear, and exact description of the invention, such as will enable others skilled in the art to which it appertains to make and use the same.

This invention relates to certain improvements in that class of cultivators known as "corn-plows," which are used to loosen and turn the earth between the rows of the growing grain; and it has for its objects to provide means for varying the relative positions of the plow-shovel and mold-board or fender, so as to adapt the plow to a variety of uses, as more fully hereinafter explained. These objects I obtain by the means illustrated in the accompanying drawings, in which—

Figure 1 represents an elevation of my improved plow or cultivator complete. Fig. 2 represents a detached view of a portion of the shovel-standard, the shovel, and the adjustable mold-board or fender. Fig. 3 represents a detached front view of the standard, shovel, and mold-board or fender. Fig. 4 represents a detached perspective view of a clamp-frame, forming a part of the connection by which the mold-board or fender is secured to the plow-standard. Figs. 5 and 6 represent detached side elevations of parts of said connection. Fig. 7 represents a side elevation of the lower portion of the connection. Fig. 8 represents a detached perspective view of the mold-board or fender; and Fig. 9 represents a perspective view of an attachment secured to the mold-board to limit its movement in respect to the parts which connect it with the shovel-standard, as more fully hereinafter specified.

Referring to the drawings, the letter A indicates the plow-beam, which is of the ordinary construction, and B B' the shovel-standards, located one ahead of the other, as shown in Fig. 1.

C C' indicate the plow-shovels, which in the present instance are of the usual curved pattern and secured to the shovel-standards in the ordinary manner.

The letter D indicates a rectangular clamp-frame, which is provided with a binding-screw E at one end and is adapted to fit upon and be secured to the forward shovel-standard above the plow-shovel, as shown in Fig. 1 of the drawings. The said clamp-frame at one end is provided with a shank or extension F, which has a vertical bolt or pin G secured thereto near its end.

The letter H indicates an arm having a series of openings $h$, either of which is adapted to set over said bolt or pin, which is provided with a nut $i$, by which the arm may be adjustably secured to the clamp-frame.

I indicates a similar arm, which is also provided with suitable apertures $m$ at proper intervals, and these arms are provided with shanks $n$ at one end, as shown in Figs. 5 and 6 of the drawings. The said arm I is adapted to be adjustably secured to the free end of the arm H by means of the shank and nut $p$.

The letter L indicates an angle-plate having a lateral flange $r$ at its upper end, which is slotted for the reception of the shank $n$ of the arm I, the angle-plate being secured thereto by means of a suitable bolt. The angle-plate is provided with a series of bolt-apertures $s$ and the mold-board or fender M with similar apertures $t$, so arranged that the angle-plate may be bolted to the mold-board in various positions in order to vary the position of the mold-board or fender with respect to the plowshare. When the fender is arranged as a side fender, attached thereto is a guide-plate $u$, Figs. 3 and 9, under which the lateral end of the angle-plate sets, which permits a limited lateral movement of the mold-board or fender. When the plate $m$ is used as a front fender, this guide-plate $u$ is not employed.

As constructed, it will be perceived that the mold-board or fender may be arranged in front of the plowshare or to any degree at one side thereof and at any desired angle thereto without removing the said mold-board from the plow by simply changing its connection. By this connection the plow is adapted to the requirements of the cultivation of growing grain as well as to the work of a number of different implements, and the mold-board may be arranged so as to throw the clods or heavy earth to the sides of the row and the lighter earth to the roots of the plants, thus providing for the proper cultivation of the same.

Having thus described my invention, what I claim, and desire to secure by Letters Patent, is—

1. The combination, in a plow, of the standard B, the clamp D, secured thereto and provided with an extension F, having a vertical pin G, the horizontal arm H, having a series of perforations adapted to set over said pin, and a shank $n$ at its extremity, the arm I, adjustably secured to the shank $n$, the angle-plate L, secured to said arm I, and the share M, secured to said angle-plate, the whole being arranged in such manner that the fender M may be moved radially with respect to the shovel C, that it may travel in front of the same or at different distances laterally therefrom, substantially as specified.

2. The combination, in a plow, of the standard B' and share C', the clamp-frame D and its clamping-screw, the adjustable arms H I, the angle-plate L, the mold-board or fender M, and the guide-plate $u$, whereby the mold-board may be adjustably secured vertically and laterally with respect to the plowshare, substantially as and for the purposes specified.

In testimony whereof I affix my signature in presence of two witnesses.

WILLIAM H. TRAMMEL.

Witnesses:
F. L. BROWNE,
J. W. HOWELL.